Figure 1:
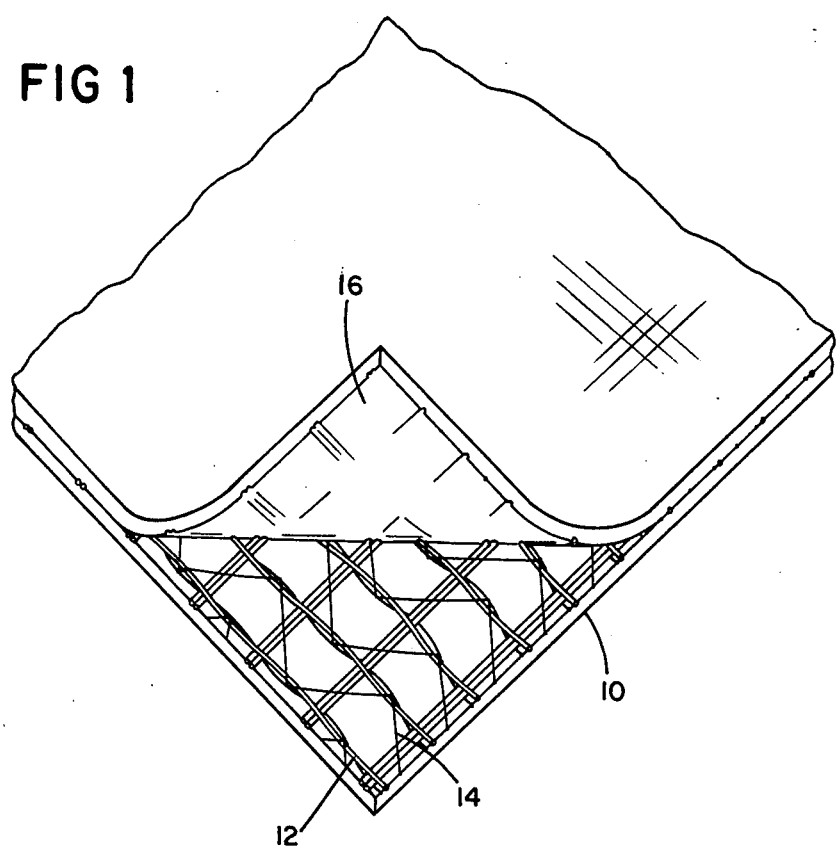

United States Patent [19]

Siener, Jr. et al.

[11] Patent Number: 4,468,422

[45] Date of Patent: Aug. 28, 1984

[54] MATERIAL USEFUL AS ROOFING

[75] Inventors: Philip R. Siener, Jr., Greene, R.I.; Joseph H. McCusker, Raynham, Mass.

[73] Assignee: Cooley Incorporated, Pawtucket, R.I.

[21] Appl. No.: 232,880

[22] Filed: Feb. 9, 1981

[51] Int. Cl.³ .............................................. B32B 3/00
[52] U.S. Cl. ...................................... 428/57; 428/141; 428/192; 428/193; 428/224; 428/252; 428/257; 428/296; 428/408; 428/902

[58] Field of Search ............... 428/105, 110, 111, 192, 428/193, 224, 257, 57, 61, 252, 267, 408, 294, 902, 296

[56] References Cited

U.S. PATENT DOCUMENTS 4,113,907 9/1978 Haage et al. ...................... 428/193

Primary Examiner—James J. Bell

[57] ABSTRACT

Fabric useful in sheet roofing is given longer life through inclusion of low-elongation threads adjacent fabric reinforcement edges.

6 Claims, 2 Drawing Figures

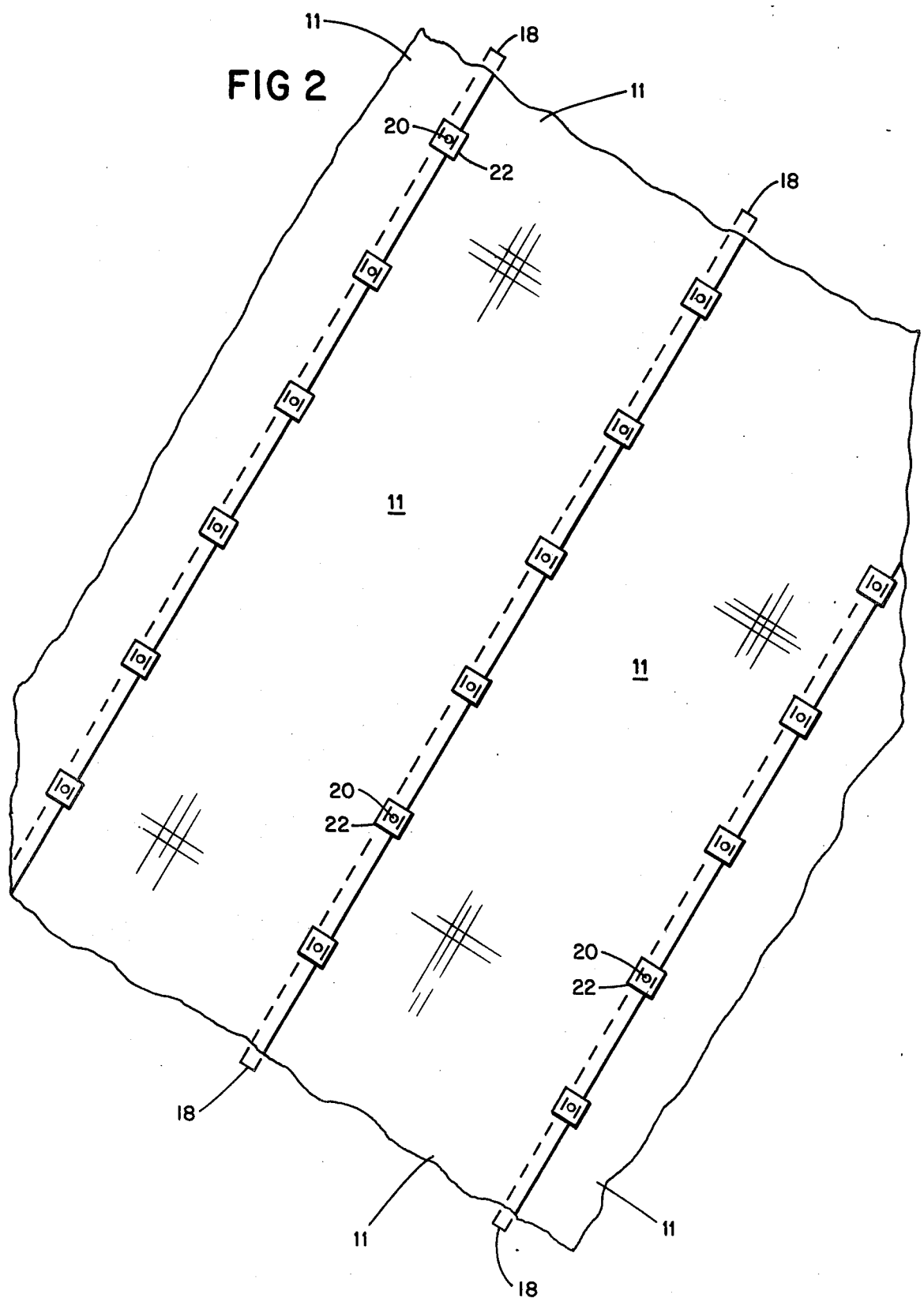

MATERIAL USEFUL AS ROOFING

FIELD OF THE INVENTION

This invention relates to sheet material particularly useful as roofing.

BACKGROUND OF THE INVENTION

It is known in the prior art of plastic sheet roofing to apply panels of sheet material, for example each about 2 feet wide, in overlapping relationship, with spaced hold-down plates, themselves secured to the roof with screws, along an edge of each panel, spaced inwardly therefrom to permit then a heat seal to an adjoining panel along the edge.

A problem has been that lift forces on the panels in consequence of wind blowing past the panels has resulted in central portions of the panels lifting up from the roof, bending the hold-down plates, and imposing peel forces on the heat seals between panels, all of which conduce unduly to failure.

SUMMARY OF THE INVENTION

We have discovered that greatly improved sheet roofing may be provided if low-elongation strands are provided in the direction parallel to one pair of panel edges. In particular, we have discovered that said strands should desirably have an elongation of not more than 5 percent under lift conditions of 60 pounds per square foot and with hold-down plates spaced on 2 foot centers in a direction parallel with the low-elongation strands.

RELATION TO OTHER APPLICATIONS

Pending applications relating to this art, the contents of which are hereby incorporated by reference herein are: (1) U.S. Ser. No. 209,720, USEFUL FORMULATION AND ELEMENTS INCORPORATING SAME, Joseph H. McCusker; and (2) U.S. Ser. No. 209,721, now U.S. Pat. No. 4,301,204 SHEET USEFUL AS ROOFING, Joseph H. McCusker and Philip Robert Siener, Jr.

PREFERRED EMBODIMENT

We turn now to description of the drawings and the structure and operation of the preferred embodiment.

DRAWINGS

There is shown in the FIG. 1 a partial, perspective view, partially broken away and exploded, of sheet material according to our invention.

FIG. 2 is a partial perspective view of a roof construction made of panels of the FIG. 1 material.

STRUCTURE

There is diagrammatically illustrated in FIG. 1 a portion of 2 foot wide panel 11 of sheet material particularly useful as a roofing material. It contains a lower layer 10 of unplasticized chlorinated polyethylene as disclosed in the above-referenced pending patent applications. Intermediately of the sandwich is a reinforcing layer of stress-free, weft insertion fabric 12 in which in addition to warp and weft threads which bear simple overlying relationships (not interwoven) is a third set of strands 14 tying together warp and woof. Although double threads are shown in a woof direction, single threads in said direction may be preferred. The panel one corner of which is shown in the drawing is about 2 feet wide. Warp threads are spaced ten per inch, and the warp threads starting with the outermost on one edge and moving in for five inches (i.e., fifty ends parallel to the edge) are aramid yarn sold by DuPont under the trademark KEVLAR Type 964 (1500 denier, 1000 filaments per thread, 1½ denier per filament). The remainder of the warp threads, are polyester (1000 denier, with 192 filaments of 5.2 denier each per thread sold by Celanese as Type 787).

Finally, there is a top layer 16 corresponding to the bottom layer 10.

Referring to FIG. 2, panels 11 are shown thermoplastically sealed to adjacent panels at overlapping portions 18 and secured to the underlying structure with screws 20 and hold-down plates 22 spaced on 2 foot centers.

OPERATION

In operation, elongation of the aramid threads is substantially negligible, eliminating as a practical matter the bending forces on the plates and the peeling forces on the thermoplastic seals characteristic of the prior art. Accordingly, the only mode tending to failure is essentially pure shear (vectorially produced by Bernoulli uplift forces), something to which the plates and screws are considerably more resistant, so that resistance to wind-induced failure is enormously increased.

OTHER EMBODIMENTS

Fabric could be woven by ordinary techniques, or even knitted. Other low-elongation yarns might be used; e.g., steel or graphite. Other embodiments will occur to those skilled in the art.

What is claimed is:

1. A roofing construction comprising
    overlapping panels of sheet material comprising outer plastic sheets and an inner fabric there between wherein said fabric includes threads of low-elongation material adjacent to at least one edge of each panel,
    said panels overlapping each other at a said one edge and being heat sealed together at overlapping portions.

2. The construction of claim 7 in which elongation of the sheet material is no more than 5% under a lifting force of 60 pounds per square foot with plates on 2 foot centers.

3. The construction of claim 2 in which said low-elongation threads are an aramid.

4. The construction of claim 3 in which said other threads thereof are polyester.

5. The roof construction of claim 1 further comprising hold-down plates at said overlapping portions.

6. The roof construction of claim 5 in which said threads are along 2 parallel edges of each said panel.

* * * * *

UNITED STATES PATENT AND TRADEMARK OFFICE
CERTIFICATE OF CORRECTION

PATENT NO. : 4,468,422
DATED : August 28, 1984
INVENTOR(S) : Philip R. Siener, Jr., et al.

It is certified that error appears in the above-identified patent and that said Letters Patent are hereby corrected as shown below:

Column 2, claim 2, line 50, "7" is changed to --1--.

Signed and Sealed this

Twenty-sixth Day of February 1985

[SEAL]

Attest:

DONALD J. QUIGG

Attesting Officer

Acting Commissioner of Patents and Trademarks